(12) United States Patent
Pietrafesa

(10) Patent No.: US 10,316,725 B2
(45) Date of Patent: Jun. 11, 2019

(54) DEVICE FOR CONNECTION OF A COMPONENT, IN PARTICULAR A PARTICULATE-FILTER UNIT, TO THE STRUCTURE OF A MOTOR VEHICLE, WITH COMPENSATION OF DIMENSIONAL VARIATIONS DUE TO MANUFACTURING TOLERANCES

(71) Applicant: FCA Italy S.p.A., Turin (IT)

(72) Inventor: Vincenzo Pietrafesa, Turin (IT)

(73) Assignee: FCA Italy S.p.A., Turin (IT)

( * ) Notice: Subject to any disclaimer, the term of this patent is extended or adjusted under 35 U.S.C. 154(b) by 59 days.

(21) Appl. No.: 15/472,597

(22) Filed: Mar. 29, 2017

(65) Prior Publication Data

US 2017/0306828 A1   Oct. 26, 2017

(30) Foreign Application Priority Data

Apr. 21, 2016  (EP) .................... 16166447

(51) Int. Cl.

| F02B 75/16 | (2006.01) |
|---|---|
| F02B 3/06 | (2006.01) |
| F02M 35/04 | (2006.01) |
| F01N 13/18 | (2010.01) |
| B01D 46/00 | (2006.01) |
| F01N 3/021 | (2006.01) |
| F01N 13/08 | (2010.01) |

(52) U.S. Cl.
CPC ......... *F01N 13/18* (2013.01); *B01D 46/0005* (2013.01); *F01N 3/021* (2013.01); *F01N 13/08* (2013.01); *F01N 13/1805* (2013.01); *F01N 13/1855* (2013.01); *B01D 2265/029* (2013.01); *B01D 2279/30* (2013.01); *F01N 2450/24* (2013.01); *Y02T 10/20* (2013.01)

(58) Field of Classification Search
CPC ...... F02B 75/16; F02B 3/06; F02B 2075/025; F02M 35/04; F02M 21/0239; F05C 2201/021; Y02T 10/32; Y10S 55/28
USPC .......... 55/385.3, DIG. 28; 123/198 E, 195 A
See application file for complete search history.

(56) References Cited

U.S. PATENT DOCUMENTS

| 3,919,995 A * | 11/1975 | Todd ................. F02B 75/16 123/195 A |
| 2014/0196973 A1 | 7/2014 | Sellars |
| 2016/0016460 A1 * | 1/2016 | Bokor ............. B01D 46/0002 55/484 |

FOREIGN PATENT DOCUMENTS

| DE | 102008051127 A1 | 4/2010 |
| EP | 2933453 A1 | 10/2015 |
| EP | 3000703 A1 | 3/2016 |

OTHER PUBLICATIONS

European Search Report for EP Application No. 16166447.9 dated Oct. 25, 2016, 3 pages.

* cited by examiner

*Primary Examiner* — Amber R Orlando
*Assistant Examiner* — Minh Chau T Pham
(74) *Attorney, Agent, or Firm* — RMCK Law Group PLC

(57) ABSTRACT

A motor-vehicle component, in particular a particulate-filter unit for diesel engines, includes a main body provided with attachments for connection to the structure of the motor vehicle and an additional body connected to said main body and in turn connected to the structure of the motor vehicle by a connection device that is able to compensate for dimensional variations due to manufacturing tolerances.

7 Claims, 6 Drawing Sheets

DEVICE FOR CONNECTION OF A COMPONENT, IN PARTICULAR A PARTICULATE-FILTER UNIT, TO THE STRUCTURE OF A MOTOR VEHICLE, WITH COMPENSATION OF DIMENSIONAL VARIATIONS DUE TO MANUFACTURING TOLERANCES

CROSS REFERENCE TO RELATED APPLICATIONS

This application claims priority to European Patent Application No. 16166447.9 filed on Apr. 21, 2016, the entire disclosure of which is incorporated herein by reference.

FIELD OF THE INVENTION

The present invention relates to a device for connection of a motor-vehicle component, in particular a particulate-filter unit of diesel engines, to the structure of a motor vehicle, of the type in which said component comprises a main body provided with attachments for connection to the structure of the motor vehicle and an additional body connected to said main body, and wherein said connection device comprises a connection flange associated to said additional body, and a main connection screw for fixing said additional body to a respective supporting member forming part of the supporting structure of the motor vehicle or rigidly connected thereto.

OBJECT OF THE INVENTION

The most general object of the present invention is to provide a connection device of the type referred to above that will be able to compensate for dimensional variations of the parts to be connected, due to manufacturing tolerances.

A further object of the invention is to provide a connection device that will be constructionally simple and inexpensive and that will enable the operations of connection to be carried out in a simple and fast way.

A more particular object of the present invention is to achieve the aforesaid aims in a connection device that can be used for connecting a particulate-filter unit of diesel engines to the structure of a motor vehicle.

SUMMARY OF THE INVENTION

With a view to achieving one or more of the above objects, the subject of the invention is a connection device presenting the characteristics referred at the start of the present description, and moreover characterized in that:
said connection flange has an eyelet for engagement of said main connection screw, which extends in a first direction;
said main connection screw is engaged with play through said eyelet of said connection flange and has a threaded end portion screwed within a threaded hole of said supporting member, said screw being oriented in a second direction orthogonal to said first direction;
set between said connection flange and said supporting member is a first arm of an L-shaped bracket;
said first arm of the L-shaped bracket has a hole traversed with play by said main connection screw;
said L-shaped bracket has a second arm, which is orthogonal to the first arm and has an eyelet, which extends in a third direction orthogonal to said first direction of the eyelet of said connection flange, and to said second direction of said main connection screw; and
engaged within the eyelet of said second arm of the L-shaped bracket is an auxiliary locking screw, oriented in said first direction and having a threaded end portion screwed within a threaded hole formed in a side wall of said connection flange, said threaded hole being formed along an axis which, in the mounted condition of said device, intersects the axis of said main screw orthogonally thereto.

Thanks to the above characteristics, the aforesaid connection flange can be ensured rapidly and in a proper way to the respective supporting member, even in the case where it is located in a position displaced with respect to its own nominal position of design on account of the manufacturing tolerances. The operation of connection can consequently be carried out without generating any forcing or undesirable stresses of the parts connected.

In the preferred embodiment, rigidly connected to said first arm of the L-shaped bracket is a bushing coaxial with said hole of said first arm, said bushing being traversed with play by said main connection screw and being in turn slidably mounted within the eyelet of said connection flange.

According to a particular and preferred aspect of the invention, the subject of the latter is specifically a particulate-filter unit for a motor-vehicle diesel engine, having a main filter body, which is to be mounted on the structure of the motor vehicle, and further including a pipe element, which is rigidly coupled to the main body of the filter and is provided with a connection device according to the invention for connection to a respective supporting member.

DETAILED DESCRIPTION OF A PREFERRED EMBODIMENT

Further characteristics and advantages of the invention will emerge from the ensuing description with reference to the annexed drawings, which are provided purely by way of non-limiting example and in which.

Figure 1:
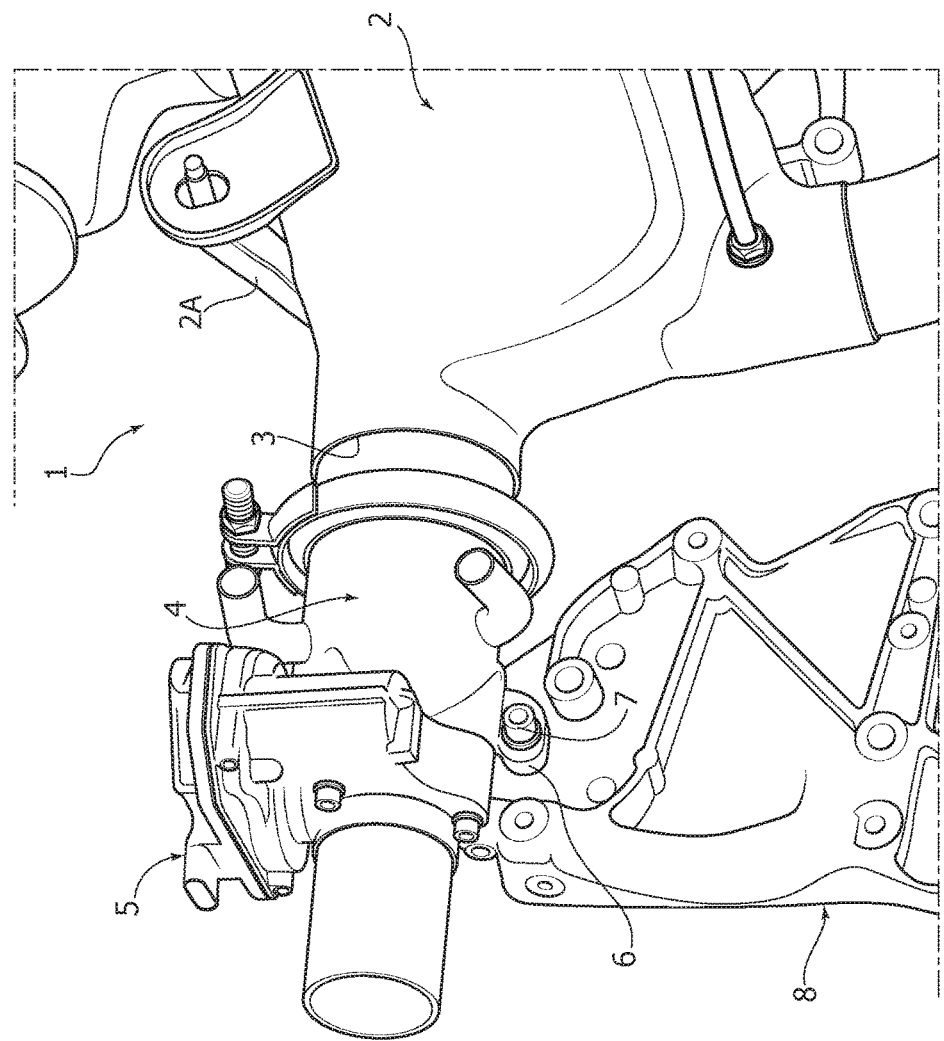
FIG. 1 is a partial perspective view of a particulate filter for motor-vehicle diesel engines, according to the prior art.
Figure 2:
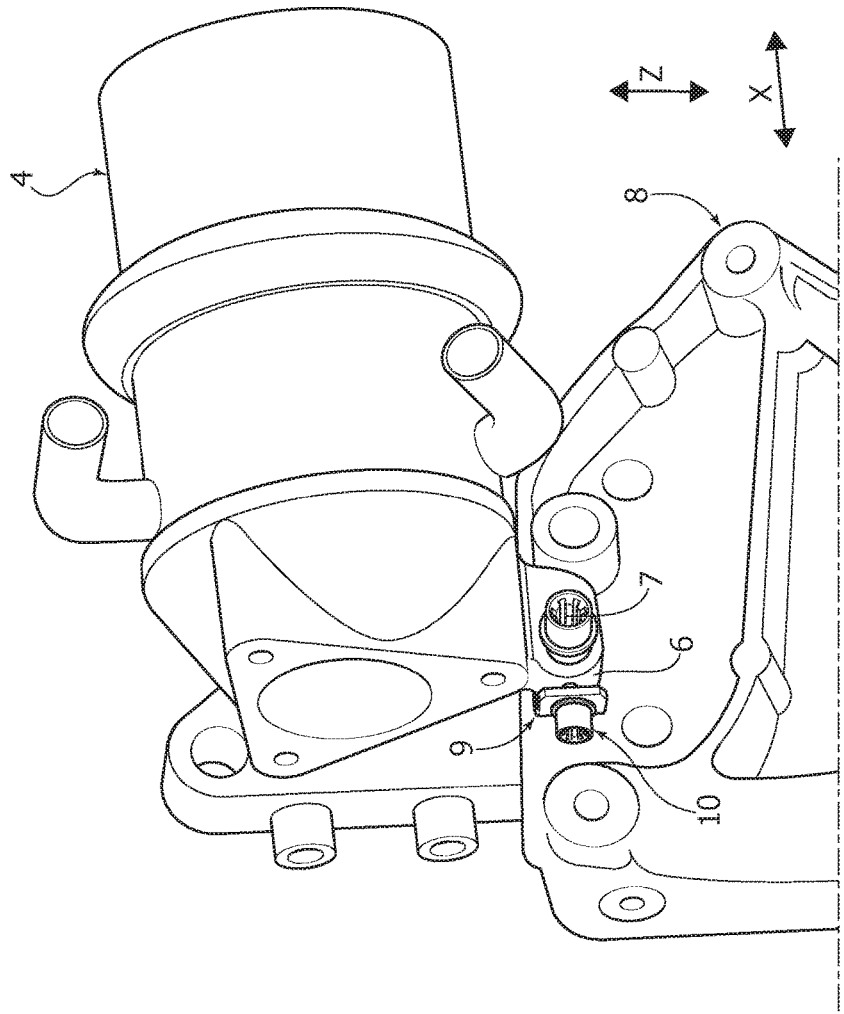
FIG. 2 is a partial view of the particulate-filter unit according to a preferred embodiment of the invention.

FIG. 1 shows a partial perspective view of a particulate-filter unit 1 for a motor-vehicle diesel engine, according to the prior art. The unit 1 comprises a particulate filter including a main body 2, which is rigidly connected under the body of a motor vehicle by means of attachment members 2A (just one of which is visible in FIG. 1) of any known type. The conformation and arrangement of said attachment members, as likewise the internal structure of the particulate filter 2 are not described or illustrated herein in so far as these details of construction have no importance for the purposes of an understanding of the present invention.

The main body 2 of the particulate filter includes a mouth 3, rigidly coupled to which is a pipe element 4 forming part of the exhaust-gas line of the motor vehicle. Also for the pipe element 4, the details regarding its general configuration are not provided herein since they are not important for an understanding of the invention. In the example illustrated, connected to the pipe element 4 is the body of a valve assembly 5 for exhaust-gas recirculation (EGR) in the engine.

The only constructional detail of the pipe element 4 that is important for the purposes of an understanding of the present invention is constituted by the fact that the body of the pipe element 4 includes a connection flange 6 that is secured by means of a main connection screw 7 to a respective supporting member 8, which, in the example illustrated in FIG. 1, is constituted by the body of the compressor of the air-conditioning system of the motor vehicle, which is in turn rigidly fixed to the structure of the motor vehicle.

All the parts described above are made of metal material. The dimensional variations deriving from the manufacturing tolerances cause, once the body 2 of the particulate filter has been secured under the body of the motor vehicle, the connection flange 6 of the pipe element 4 possibly not to be located in the nominal design position with respect to the member 8, in which the main connection screw 7 can engage a respective threaded hole provided in the supporting member 8. Assembly is thus carried out, exploiting the deformability of the metal components of the unit described above, by forcing the flange 6 to reach the correct position, where the connection screw 7 can be engaged through the corresponding hole in the flange 6 and in the threaded hole of the supporting member 8. The operation of assembly is consequently long and laborious and also entails an undesirable stress on the components of the unit.

FIGS. 2-6 illustrate a preferred embodiment of the unit according to the invention. In these figures, the parts corresponding to those of FIG. 1 are designated by the same reference numbers.

In the case of the present invention the connection flange 6 has, for engagement of the main connection screw 7, an eyelet 60 elongated in a first direction X. The connection screw 7 has a head 70 and a stem 71 (see in particular FIG. 4), which has a threaded end portion 72 that is screwed within a threaded hole 80 of the supporting member 8. As may be seen from the drawings, the axis of the screw 7 sets itself in a second direction Y orthogonal to the first direction X.

Figure 3:
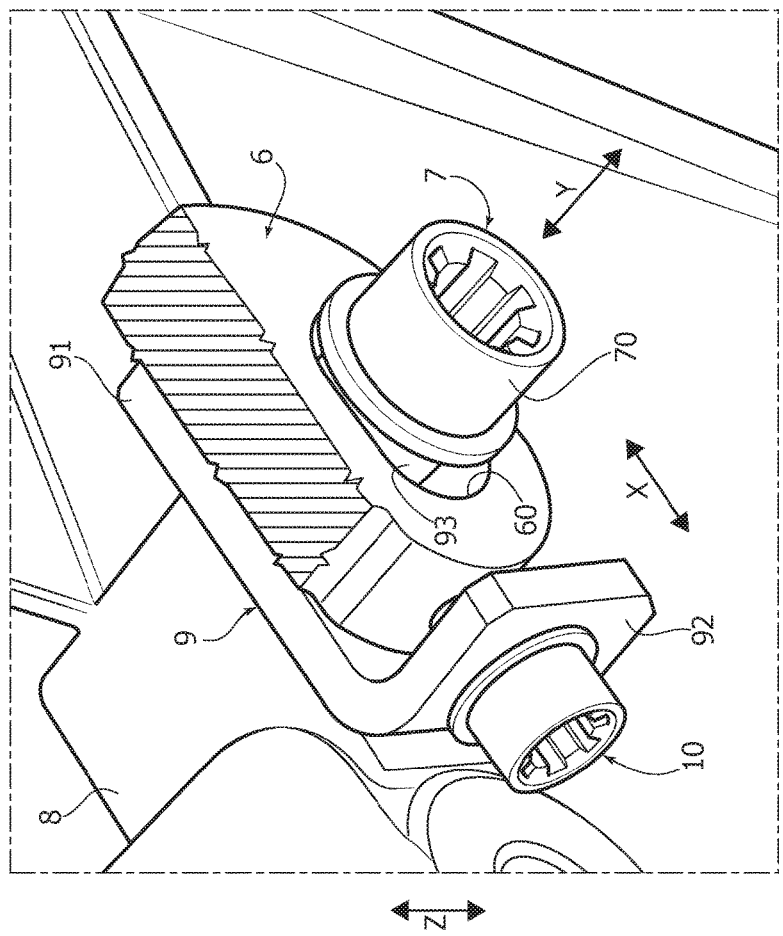
FIG. 3 is a perspective view at an enlarged scale of a detail of FIG. 2.
Figure 4:
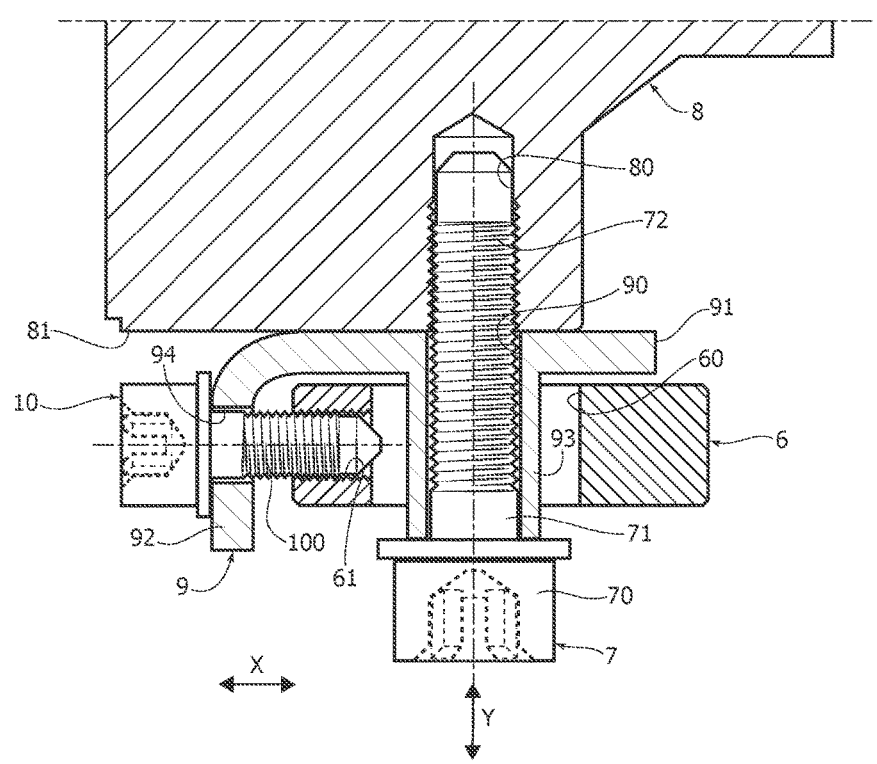
FIG. 4 is a cross-sectional view of the detail of FIG. 3.
Figure 5:
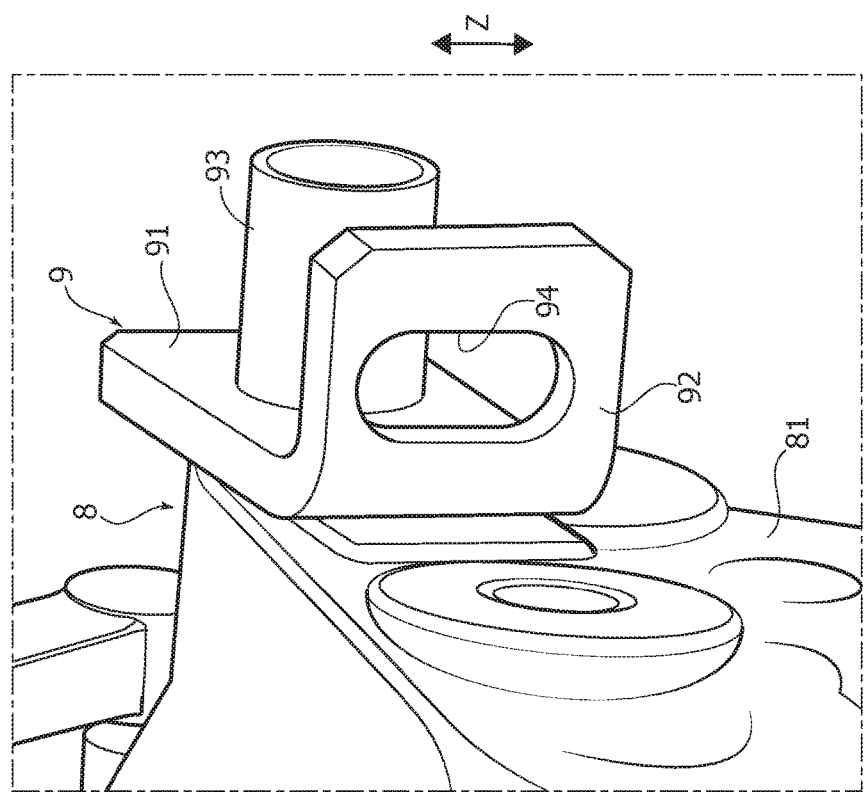
FIGS. 5 and 6 are further perspective views that show some components of the connection device forming part of the unit according to the invention.
Figure 6:
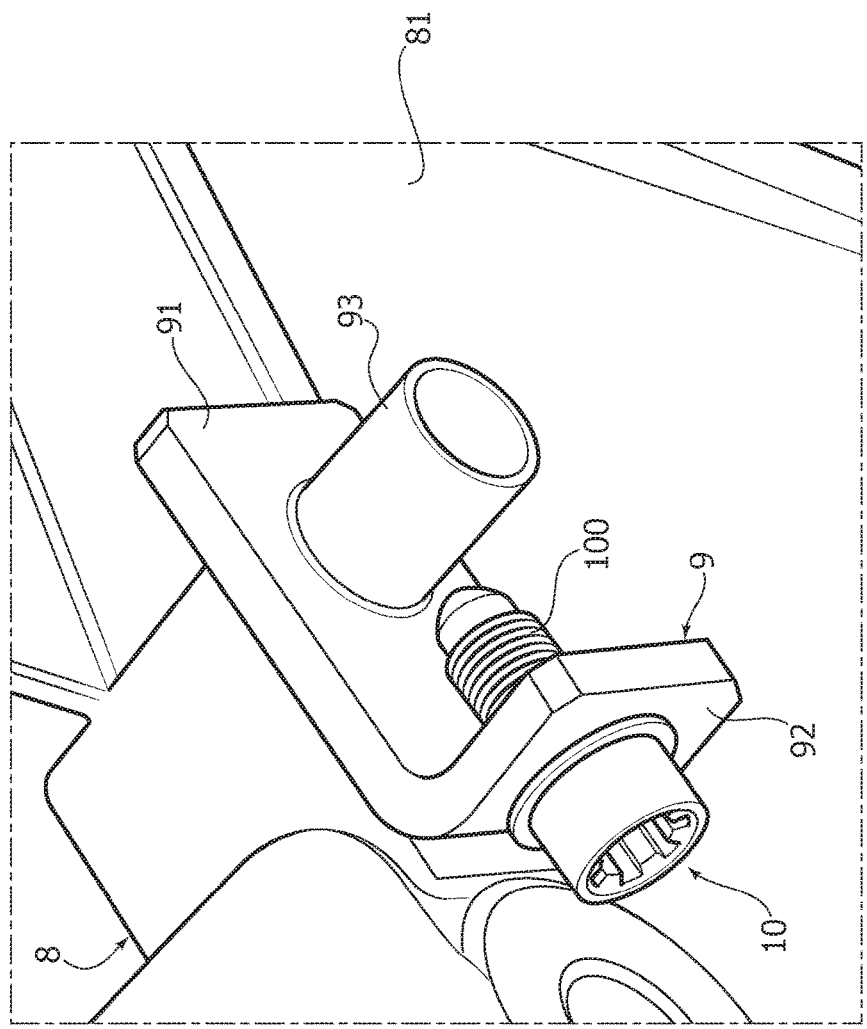

With reference, in particular, to FIGS. 3 and 4, set between the connection flange 6 and a front face 81 of the supporting member 8, formed in which is the threaded hole 80, is a first arm 91 of an L-shaped bracket 92, having a circular hole 90 traversed with play by the stem 71 of the screw 7.

In the preferred embodiment illustrated herein, rigidly connected to the aforesaid first arm 91 of the L-shaped bracket 9 (for example, by welding) is a bushing 93, which is coaxial with the hole 90 and is also engaged with play by the stem 71 of the screw 7. The bushing 93 that is traversed by the stem 71 of the screw 7 is in turn able to slide within the eyelet 60 of the connection flange 6. With reference, in particular, to FIG. 4, the bushing 93 projects from the first arm 91 of the L-shaped bracket 9 for an axial length greater than the dimension of said connection flange 6 in the second direction Y in such a way that in the condition where said main connection screw 7 is tightened, with its head 70 bearing upon an end surface of the bushing 93 (FIG. 4), between said first arm 91 of the L-shaped bracket 9 and said head 70 of the main connection screw 7 a space remains available for the connection flange 6 that is greater than the aforesaid dimension of the flange 6.

The second arm 92 of the L-shaped bracket 9, set orthogonal to the first arm 91, has an eyelet 94 oriented in a third direction Z orthogonal both to the first direction X of the eyelet 60 and to the second direction Y of the main connection screw 7. The eyelet 94 is traversed by an auxiliary locking screw 10, which has a threaded portion 100 that is screwed within a threaded hole 61 formed in a side wall 62 of the connection flange 6. The threaded hole 61 is formed along an axis which is parallel to the first direction X. Moreover, in the mounted condition, the axis of hole 61 intersects the axis of the main screw 7 orthogonally.

Consequently, the position of the connection flange 6 in the direction Z (i.e., in the vertical direction, as viewed in the drawings) is defined by engagement of the screw 7 within the slot 60. The position of the connection flange 6 in the direction Y is defined by engagement of the auxiliary locking screw 10 within the threaded hole 61 made in the side wall of the connection flange 6. Finally, the position of the connection flange 6 in the direction X of the slot 60 is also defined by engagement of the auxiliary locking screw 10 within the hole 61 in the side wall of the connection flange 6. The degree of tightening of the screw 10 within the hole 61 can be varied to provide a possibility of variation in positioning of the flange 6 in the direction X on account of the manufacturing tolerances.

As is evident from the foregoing description, installation of the particulate-filter unit is simple and convenient even in the case of dimensional variations that bring the connection flange 6 to be in a position different from a predetermined position with respect to the hole 90 of supporting member 8, due to manufacturing tolerances. The eyelet 94 enables proper engagement of the screw 10 within the threaded hole 61 of the flange 6, compensating for the play existing between the hole 90 of the L-shaped bracket 9 and the stem 71 of the screw 7. Installation is obtained without the risk of generating any undesirable forcing or stresses of the connected parts.

The connection device according to the invention has a simple, reliable, and low-cost structure. It can of course be used also in applications other than the one illustrated by way of example herein.

Naturally, without prejudice to the principle of the invention, the details of construction and the embodiments may vary widely with respect to what has been described and illustrated herein purely by way of example.

What is claimed is:

1. A device for connection of a motor-vehicle component to a structure of a motor vehicle:

said component comprising a main body provided with attachments for connection to the structure of the motor vehicle and an additional body connected to said main body; and said device comprising a connection flange associated to said additional body and a main connection screw for fixing said additional body to a respective supporting member forming part of the structure of the motor vehicle or rigidly connected thereto;

wherein:

said connection flange has a first eyelet for engagement of said main connection screw, said first eyelet extending in a first direction;

said main connection screw is engaged with play through said first eyelet of said connection flange and has a first threaded end portion screwed within a first threaded hole of said supporting member, said main connection screw being oriented in a second direction orthogonal to said first direction;

arranged between said connection flange and said supporting member is a first arm of an L-shaped bracket;

said first arm of the L-shaped bracket has a hole traversed with play by said main connection screw;

said L-shaped bracket has a second arm orthogonal to the first arm and having a second eyelet, which extends in a third direction orthogonal to said first direction of the first eyelet of said connection flange, and to said second direction of said main connection screw; and engaged within the second eyelet of said second arm of the L-shaped bracket is an auxiliary locking screw, oriented in said first direction and having a second threaded end portion screwed within a second threaded hole formed in a side wall of said connection flange, said second threaded hole being formed along an axis which, in the mounted condition of said device, intersects the axis of said main connection screw orthogonally thereto.

2. The connection device according to claim 1, wherein rigidly connected to said first arm of the L-shaped bracket is a bushing coaxial with said hole of said first arm, said bushing being traversed with play by said main connection screw and being in turn slidably mounted within the first eyelet of said connection flange.

3. The connection device according to claim 2, wherein said bushing projects from said first arm of the L-shaped bracket for an axial length greater than a dimension of said connection flange in the second direction, in such a way that in a condition where said main connection screw is tightened, with its head bearing upon an end surface of the bushing, between said first arm of the L-shaped bracket and said head of the main connection screw a space remains available for the connection flange that is greater than the dimension of said connection flange, a position of the connection flange in said second direction being defined by engagement of said auxiliary locking screw within the second threaded hole made in the side wall of the connection flange.

4. A particulate-filter unit for a motor-vehicle diesel engine, having a main filter body, which is to be mounted on the structure of the motor vehicle, and further including a pipe element, which is rigidly coupled to the body of the filter and is provided with a connection device according to claim 1, for connection to the respective supporting member forming part of the structure of the motor vehicle, or rigidly connected thereto.

5. The particulate-filter unit according to claim 4, wherein said main body comprises a mouth coupled to said pipe element, said pipe element being connected to an exhaust-gas line of the motor-vehicle diesel engine, wherein the pipe element has a body defining said connection flange, and said connection flange is oriented with its first eyelet directed parallel to an axis of said pipe element.

6. The connection device according to claim 1, wherein said first eyelet comprises a first elongated slot, said first elongated slot being elongated or longitudinally extending in the first direction.

7. The connection device according to claim 6, wherein said second eyelet comprises a second elongated slot, said second elongated slot being elongated or longitudinally extending in the third direction.

* * * * *